Figure 1:
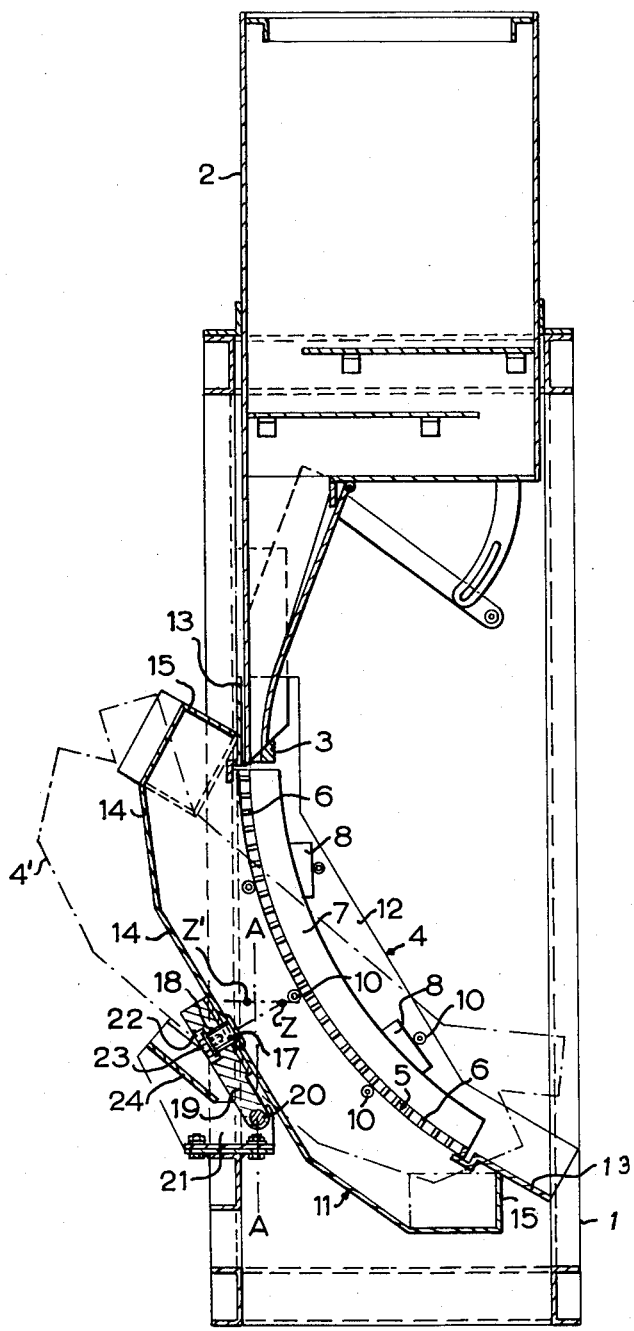

Nov. 7, 1961  J. DE. KONING  3,007,574
SCREENING APPARATUS

Filed June 8, 1959  2 Sheets-Sheet 1

Inventor
Jan De Koning
By Cushman, Darby & Cushman
Attorneys

United States Patent Office 3,007,574
Patented Nov. 7, 1961

3,007,574
SCREENING APPARATUS
Jan de Koning, Amsterdam, Netherlands, assignor to Stamicarbon N.V., Heerlen, Netherlands
Filed June 8, 1959, Ser. No. 818,742
Claims priority, application Netherlands June 9, 1958
5 Claims. (Cl. 209—251)

This invention relates to particle separation and more particularly to improvements in separating apparatus of the sieve bend type, such as described in Fontein application Serial No. 475,251 filed December 14, 1954, now Patent No. 2,916,142.

As disclosed in the above application, a sieve bend includes a cylindrically curved separating body or screening deck having a feed end, a discharge end and a separating surface extending therebetween defining a plurality of transversely extending separating apertures. The separating body is arranged to have particles to be separated and a suspending liquid fed tangentially to the concave side thereof in layer formation at an initial velocity sufficient to cause an oversize fraction to pass from the feed end to the discharge end. The separating surface is such that during the passage of the layer of particles and suspending liquid thereover successive layers of a thickness substantially less than the width of the separating apertures are scraped off or blocked, the particles less than the aperture size and liquid thus blocked passing through the separating apertures as the undersize fraction.

In the preferred embodiment of the sieve bend apparatus, the separating surface is formed by a plurality of parallel bars extending perpendicular to the direction of flow. These bars include edges which face in the direction of the feed end and serve to block the successive layers to thereby obtain the separating effect. Where the particles are somewhat abrasive, these edges become worn in time with a resultant decrease in the separating performance. In order to increase the useful life of the sieve bend at maximum performance, the bars are preferably made symmetrical so that by reversing the screening deck the edge of bars originally facing the discharge end can be selectively made to effect the blockage of the successive layers.

Thus, in many sieve bend installations, there is a need to periodically reverse the separating body or screening deck. The length of these periods depends of the material and the degree of loading of the sieve bend. Sieve bends equipped with a light screening deck, can be reversed manually. However, with larger installations, where the screening deck becomes unmanageable and might incur damage due to its dimensions and weight, other measures must be taken. For example, it has been proposed to install the screening deck in a holder that can be swung on a horizontal shaft as disclosed in U.S. Patent No. 2,748,941 issued June 5, 1956. This installation has the disadvantage of requiring a floor space which is about twice that of a sieve bend with a one-position screening deck. Moreover, it is necessary for the sieve bend, together with its feeding device, to be mounted at a higher level so as to provide a sufficiently large gradient for discharging the oversize fraction when the sieve bend has been tilted.

In Fontein et al. Patent No. 2,814,388 issued November 26, 1957, there is disclosed a number of constructions by which one or both of these disadvantages can be overcome. According to these proposals, the screening deck is moved out of its operative position and swung on one or more shafts. Upon restoration of the screening deck to its operative position, the feeding and discharge ends have then changed places. In one of these embodiments, the holder can be swung on a shaft lying in the plane of symmetry and in the bisector of the sector angle of the screening deck. Moving the holder with the screening deck out of its operative position is necessary to prevent the screening deck and/or the holder, during tilting, from getting into contact with the feeding or discharging device or with both.

The drawbacks of the installation described in U.S. Patent No. 2,748,941 manifest themselves particularly when more sieve bends, arranged in parallel, are installed on a suction dredger. Each of such sieve bends must handle large amounts of material per unit time and, in consequence, is bulky and heavy. The sieve bends must be placed as close together as possible. Furthermore the nature of the work involves that it must be possible for the sieve bend to be reversed rapidly and with little exertion. Under these more exacting requirements the embodiments disclosed in Patent No. 2,814,388 have not proven entirely satisfactory.

Accordingly, it is an object of the present invention to provide a separating apparatus of the type described having improved means for effecting end-to-end reversal of the screening deck which permits rapid reversal with little exertion and thus satisfies the exacting requirements noted above.

These demands are satisfied by the installation according to the present invention by mounting the screening deck in a holder, the holder being fastened to means for moving it out of its operative position and being capable of pivoting on a central shaft lying in the plane of symmetry and in the bisector of the sector angle of the screening deck, the construction being such that the holder, by hinging it on a horizontal shaft, can be placed in a position in which it is capable of pivoting on the central shaft without the sieve bend getting into contact with the feeding and discharging devices.

Another object of the present invention is the provision of a separating apparatus of the type described in which the horizontal shaft is arranged at a level lower than that of the central shaft and at such a point that during rotation on the horizontal shaft the center of gravity of the sieve bend will travel substantially along the upper part of the circle of rotation so that only a small force is needed for hinging the sieve bend on the horizontal shaft.

Still another object of the present invention is the provision of a separating apparatus of the type described having improved means for supporting the sieve bend after it has been moved out of its operative position, the arrangement being such that the center of gravity of the sieve bend is so placed relative to the vertical plane through the axis of rotation that the screening deck is kept in its operative position by the weight of the sieve bend and that when the sieve bend is moved out of its operative position the center of gravity moves through this vertical plane so that the sieve bend will be kept, by its own weight, in the position in which it is pivoted on its central axis.

These and other objects of the present invention will become more apparent during the course of the following detailed description and appended claims.

The invention may best be understood with reference to the accompanying drawings wherein an illustrative embodiment is shown.

Figure 2:
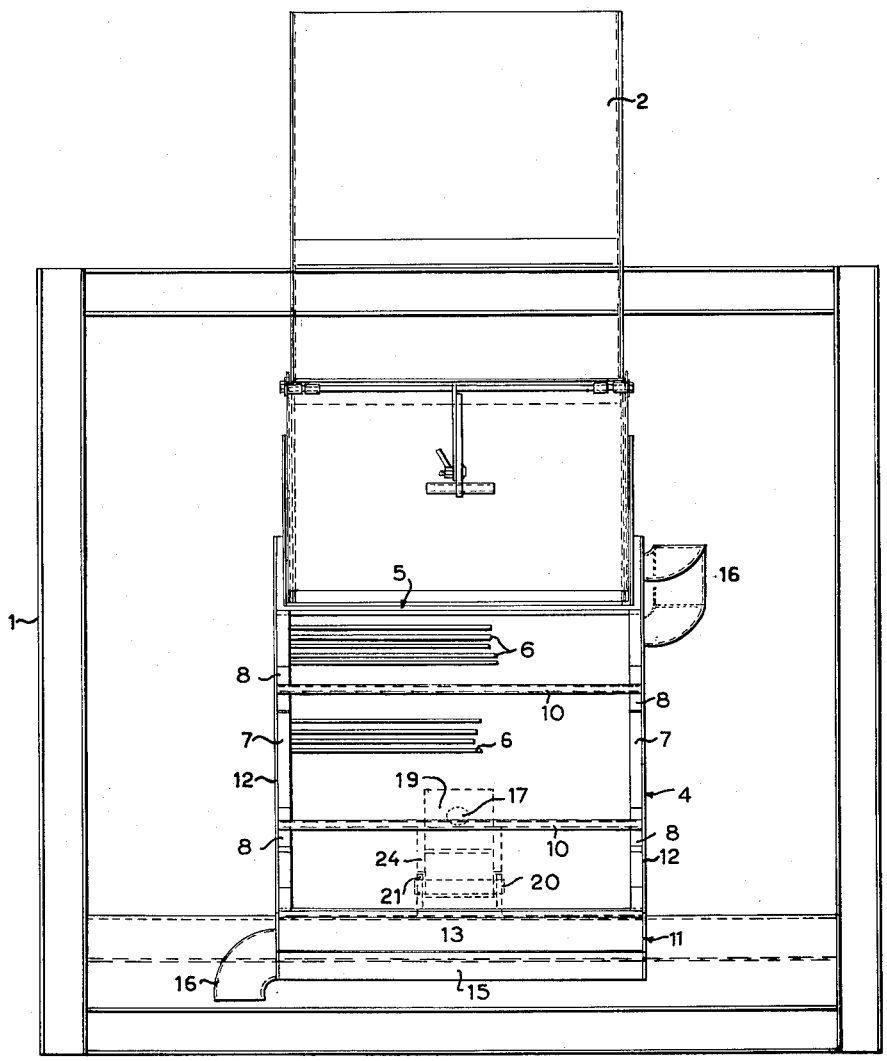

In the drawings:

FIGURE 1 is a vertical sectional view of a sieve bend installation embodying the principles of the present invention, the sieve bend being shown in dot-dash lines in its inoperative position; and FIGURE 2 is a front elevational view of the installation.

Referring now more particularly to the drawings, there is shown an installation embodying the principles of the present invention which includes an open box-like frame 1 of any suitable construction such as channel and/or angle irons welded together, which rigidly supports at its upper end a feeding device 2, having a slot-shaped aperture 3 formed at its lower end. Mounted under the aperture 3 is a sieve bend 4 constructed in accordance with the disclosure of the aforesaid Fontein application, Serial No. 475,251, and now Patent No. 2,916,142, and including a screening deck 5 comprising horizontal bars 6 (separated by slots) which in FIGURE 2 have, for the sake of clarity, been represented by a number of parallel lines. The bars are disposed between two curved plates 7 which, by means of wedges 8, clamp the screening deck 5 between a series of spaced supporting rods 10. In this way, the screening deck 5 is accommodated in a holder 11, which comprises side plates 12 between which rods 10 extend, guide plates 13 for the oversize fraction from the screening deck and an angular bottom wall 14. The bottom wall 14 which includes a pair of raised end walls 15, constitutes the collecting chamber for the undersize fraction of the sieve bend. Near the top and base of casing 11 discharge ducts or nozzles 16 for the undersize fraction are constructed in the side walls.

Fixed to the wall 14 in the plane of symmetry and the bisector of the sector angle of the screening deck is a cylindrical shaft 17 capable of pivoting in a bore 18 formed in the upper portion of a thick plate defining an arm 19. The lower end of the arm 19 is hinged on a horizontal shaft 20 carried in apertured lugs 21 suitably fixed on frame 1. Shaft 17 is kept in its position by a washer 22 and a nut 23. The lugs 21 have rigidly secured therebetween a supporting plate 24, disposed in a position to be engaged by the arm 19 when pivoted on shaft 20.

In its operative position, the center of gravity of the sieve bend including the arm 19, indicated at Z in FIGURE 1, is disposed to the right of a vertical plane, indicated at AA in FIGURE 1 passing through the axis of the shaft 20 so that the sieve bend 4 tends to move in a clockwise direction about the shaft 20. Movement in a clockwise direction is prevented by the engagement of the upper guide plate 13 with the feed device 2 so that the weight of the sieve bend itself serves to maintain it in its operative position as shown in full lines in FIGURE 1. When it is desired to reverse the screening deck 5, the sieve bend is pivoted in a counter-clockwise direction as viewed in FIGURE 1 about the axis of the shaft 20 until the arm 19 engages the supporting plate 24, as shown in dot-dash lines in FIGURE 1. With the sieve bend in its dot-dash line position, the center of gravity of the sieve bend and arm 19, as indicated at Z', is now disposed to the left of plane AA so that the weight of the sieve bend and arm 19 tends to maintain the same in its inoperative or dot-dash position. In hinging or pivoting the sieve bend on the shaft 20 therefore, the center of gravity of the latter travels through the upper part of its circle of rotation so that it moves along a substantially horizontal line. Consequently, the power consumption needed for tilting the sieve bend is reduced to a minimum.

It will be noted that when the sieve bend is disposed in its inoperative position it is free to pivot on the central shaft 17 without the casing or screening deck coming into contact with the lower end of the feed device 2.

In this way the screening deck may be readily reversed end for end while in its inoperative position. After the reversal has been accomplished, the sieve bend can be easily pivoted or hinged back into its operative position with virtually no manual effort. The arrangement has the additional advantage that no means need be provided for maintaining the sieve bend in its inoperative position during its reversal end for end. Of course, since the sieve bend is symmetrical, the center of gravity Z' does not change during such reversal.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A separating apparatus comprising a screening deck disposed in an operative position to receive at one end a liquid suspension of particles fed from a fixed feeding position to one side thereof and to discharge at its opposite end an oversize fraction into a fixed discharging position, means disposed adjacent the other side of said screening deck for collecting an undersize fraction passing through said screening deck, and means supporting said screening deck for movement out of said operative position and back into said operative position in end for end reversed relation so that said opposite end receives the suspension fed from said fixed feeding position and said one end discharges the oversize fraction into said fixed discharge position, said supporting means comprising an arm mounted adjacent the underside of the screening deck for pivotal movement about a fixed horizontal axis, said screening deck being pivotally mounted on said arm for movement about an axis disposed centrally of the plane of symmetry of said screening deck said axis being fixed with respect to said screening deck and said arm.

2. Apparatus as defined in claim 1 wherein said undersize fraction collecting means comprises a walled chamber fixedly receiving said screening deck and wherein said screening deck is pivotally mounted on said arm by means of a central shaft interconnecting said arm and said walled chamber, said fixed horizontal axis being disposed below said central shaft in such a position that said screening deck can be moved out of its operative position by pivotal movement of said arm, walled chamber and screening deck about said horizontal axis, the center of gravity of said arm, walled chamber, and screening deck being located relative to said fixed horizontal axis such that it moves on opposite sides of a vertical plane intersecting said horizontal axis during the movement of said screening deck into and out of its operative position.

3. Apparatus as defined in claim 2 including means for engaging said arm to maintain said screening deck out of its operative position.

4. Apparatus as defined in claim 1 including a support fixed to said frame for engaging said arm to maintain said screening deck in its inoperative position so that the latter can be reversed end for end about said central axis.

5. Apparatus as defined in claim 4 wherein said means for pivotally connecting said arm with said screening deck includes a walled chamber fixedly receiving said screening deck and surrounding the convex side thereof for collecting and discharging an undersize fraction passing through the screening deck, and a central shaft between said arm and said walled chamber, said fixed horizontal shaft and the center of gravity of said arm, walled chamber and screening deck being so related that said center of gravity shifts on opposite sides of a vertical plane intersecting said fixed horizontal axis when said screening deck is moved between its operative and inoperative positions whereby said screening deck is maintained by gravity in such positions.

References Cited in the file of this patent

UNITED STATES PATENTS

| | | |
|---|---|---|
| 1,185,595 | Daly | May 30, 1916 |
| 1,512,382 | Walsh | Oct. 21, 1924 |
| 2,748,941 | Fontein | June 5, 1956 |
| 2,814,388 | Fontein | Nov. 26, 1957 |